United States Patent
Yochai et al.

(10) Patent No.: US 6,954,833 B1
(45) Date of Patent: Oct. 11, 2005

(54) EXPEDITED DYNAMIC MIRROR SERVICE POLICY

(75) Inventors: Yechiel Yochai, Brookline, MA (US); Sachin More, Marlborough, MA (US); Ron Arnan, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 433 days.

(21) Appl. No.: 09/895,941

(22) Filed: Jun. 29, 2001

(51) Int. Cl.[7] .......................... G06F 12/00; G06F 12/16
(52) U.S. Cl. .......................... 711/162; 710/18; 711/111
(58) Field of Search .......................... 709/105; 710/18; 711/111, 112, 114, 162; 714/6, 7

(56) References Cited

U.S. PATENT DOCUMENTS

| | | | |
|---|---|---|---|
| 5,333,315 A | * | 7/1994 | Saether et al. .................. 707/1 |
| 6,061,761 A | * | 5/2000 | Bachmat ...................... 711/114 |
| 6,112,257 A | * | 8/2000 | Mason et al. .................. 710/18 |
| 6,611,896 B1 | * | 8/2003 | Mason et al. ................ 711/114 |
| 6,715,054 B2 | * | 3/2004 | Yamamoto .................. 711/170 |
| 6,775,739 B1 | * | 8/2004 | Bachmat et al. ............ 711/114 |

OTHER PUBLICATIONS

S. Chen and D. Towsley, "Performance of a Mirrored Disk in a Real -Time Transaction System," University of Massachusetts, Amherst, MA 01003, © 1991 ACM.

L. Golubchik, J. C. S. Lui and R. R. Muntz, "Chained Declustering: Load Balancing and Robustness to Skew and Failures," University of California, Los Angeles, CA 90024, © 1992 IEEE.

* cited by examiner

*Primary Examiner*—Gary Portka
(74) *Attorney, Agent, or Firm*—Daly, Crowley, Mofford & Durkee, LLP

(57) ABSTRACT

A seek minimizing process for use in storage controller of a data storage system is presented. The process collects statistics for physical devices storing mirrored logical volumes. The statistics include utilization and activity level. The process determines from the statistics the top n busiest physical devices. The process evaluates each of the n physical devices for mirror policy adjustment that will result in reduced seek time when the utilization of the physical device is greater than a threshold, for example, 50%.

18 Claims, 7 Drawing Sheets

EXPEDITED DYNAMIC MIRROR SERVICE POLICY

BACKGROUND OF THE INVENTION

The invention relates generally to data storage systems, and in particular, to data storage systems in which data is stored on mirrored logical volumes.

Various techniques have been developed for increasing the reliability of data storage systems and to protect against failure due to data loss. One such technique is data mirroring, which involves the storage of two or more copies of the data, preferably on different storage devices. A data storage having mirrored data operates to maintain all copies up to date. Typically, there are two copies.

In a typical data storage system, each physical device, such as a disk storage device, may have a format that defines a number of units, and the units may correspond to logical volumes. Each logical volume appears to the host computer or computers to be a separate storage device and, therefore, operations take place with regard to the logical volume as if it were a physical volume. Typically, the physical devices are configured as mirrored pairs, with each physical device in the pair storing corresponding copies of logical volumes. Such a data storage system is said to employ both mirrored physical devices and mirrored logical copies.

Some logical volumes are accessed for read and/or write operations substantially more often than other logical volumes, and the nature of the operations can vary from random accesses to sequential accesses during any particular sequence of read or write operations. As a result, with larger storage devices, the risk of having concurrent jobs, each pertaining to a relatively small file (local activity) interfering with each other's activity increases. The use of striping techniques further increases the risk. Depending upon the nature and frequency of the read and write operations to a storage device containing many logical volumes, the disk read/write heads may be severely worked and response time can, on average, be increased if sequential read and write locations are not located near one another.

One prior solution sets a mirror service policy, statically or preferably dynamically (as described in U.S. Pat. No. 6,112,257, the contents of which are incorporated herein, by reference), in an attempt to optimize the reading and writing of data. Such a policy may, for example, assume that most data transfers are sequential in nature, or that they are random.

One such policy is to only service requests that fall within the first half of a logical volume on one of a mirrored pair of physical devices and the requests to the second half of the logical volume on the other, mirrored physical device. Another policy might be to only service requests that fall in odd groups with a group being defined in terms of a number of blocks. For instance the first group (blocks 0-959) will be serviced by copy 1 and the next group by copy 2, etc.

The approach described in the above-referenced patent sorts logical volumes by activity level, load balances the physical devices based on the activity levels of the logical volumes and minimizes seeks for the logical volumes on the same physical devices.

Because volumes do not necessarily reside on mirrored physical devices, it is desirable also, to ensure load balancing over the non-mirrored physical devices. Another technique, described in U.S. application Ser. No. 09/382,752 now U.S. Pat. No. 6,611,896, filed Aug. 25, 1999, and entitled Dynamic Mirror Service Policy With Seek Adjustment in a Non-Physical Mirrored Storage Environment, the contents of which are incorporated herein, by reference, provides for a seek minimization to adjust seek activity when logical volumes, but not necessarily physical devices, are mirrored.

SUMMARY OF THE INVENTION

In one aspect of the invention, response time of physical devices in a data storage system is optimized by collecting statistics for each of the physical devices, determining from the statistics the n most active of the physical devices and, for each of the n most active of the physical devices, adjusting a mirror service policy associated with one or more mirrored logical volumes serviced by the physical device to reduce seek time.

Embodiments of the invention may include one or more of the following features.

The physical device statistics include utilizations and adjusting is performed if the utilization of the physical device is greater than a threshold value.

One or more aspects of the invention may include one or more of the following advantages. Activity level sorts are performed on physical devices (and only the n busiest of the physical devices), instead of the logical volumes in a data storage system. Thus, the time-consuming logical volume based sorting and load balancing of the physical devices on a logical volume by logical volume basis (as performed by prior approaches) is eliminated. Consequently, seek (and, therefore, response time) optimization based on dynamic mirror service policy adjustment can be performed on a more frequent a basis and so adjusts more quickly to changes in workload.

Other features and advantages of the invention will be apparent from the following detailed description and from the claims.

DETAILED DESCRIPTION

Figure 1:
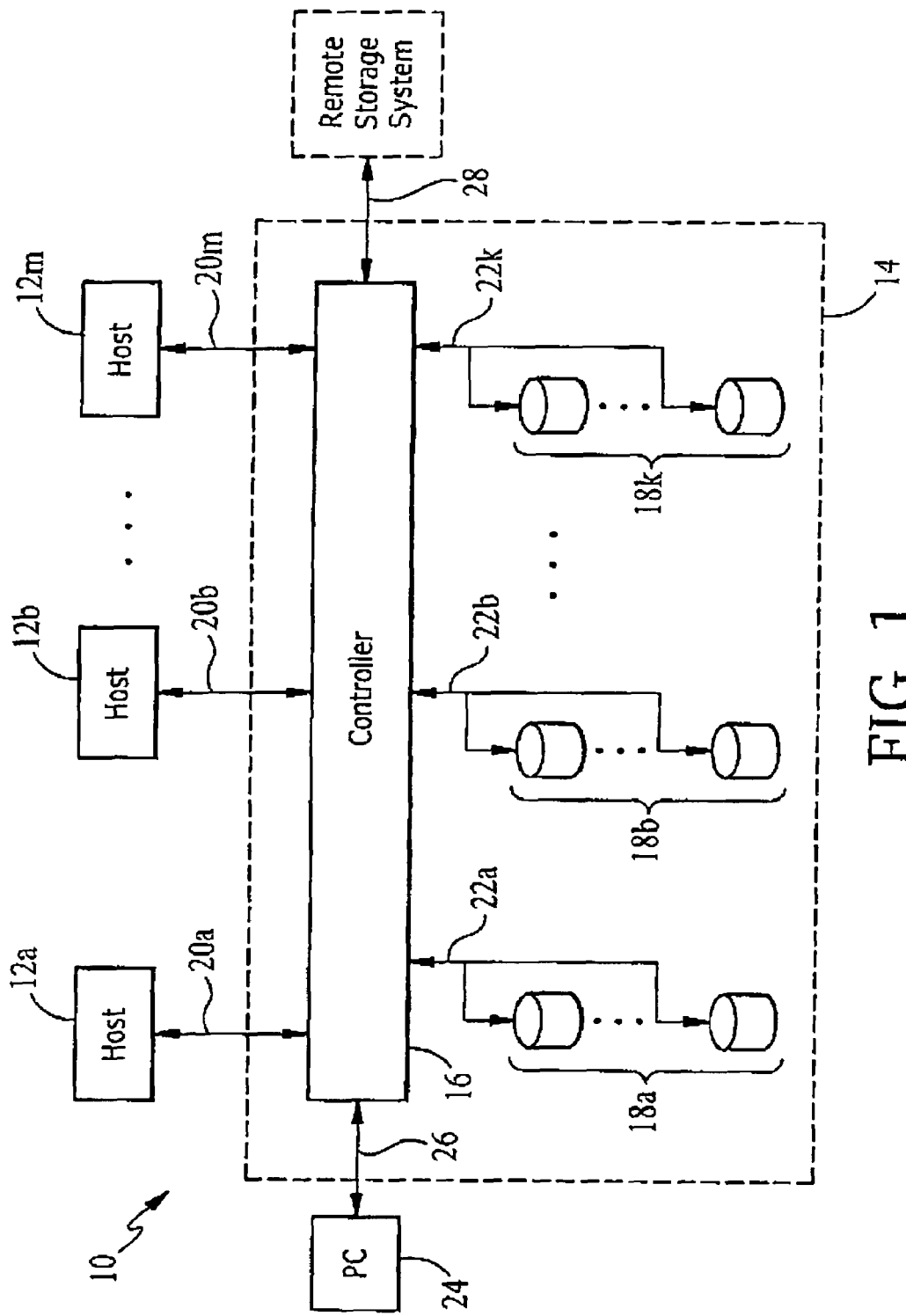
FIG. 1 is a block diagram of a data storage system in which the invention can be employed.

Referring to FIG. 1, a data processing system 10 includes host computers 12a, 12b, . . . , 12m, connected to a data storage system 14. The data storage system 14 receives data and commands from, and delivers data and responses to, the host computers 12. The data storage system 14 is a mass storage system having a controller 16 coupled to pluralities of physical storage devices shown as disk devices 18a, disk devices 18b, . . . , disk devices 18k. Each of the disk devices 18 is logically divided, in accordance with known techniques, into one or more logical volumes.

The controller 16 interconnects the host computers 12 and the disk devices 18. The controller can be, for example, a controller of the Symmetrix data storage system from EMC Corporation. Although described herein as a component of a data storage system, the controller 16 could also be a separate appliance or server. The controller 16 thus receives memory write commands form the various host computers over buses 20a, 20b, . . . , 20m, respectively, for example, connected and operated in accordance with a SCSI protocol, and delivers the data associated with those commands to the appropriate devices 18a, 18b, . . . , 18k, over respective connecting buses 22a, 22b, . . . , 22k. Buses 22 also operate in accordance with a SCSI protocol. Other protocols, for example, Fibre Channel, could also be used for buses 20, 22. The controller 16 also receives read requests from the host computers 12 over buses 20, and delivers requested data to the host computers 12, either from a cache memory of the controller 16 or, if the data is not available in cache memory, from the disk devices 18.

In a typical configuration, the controller 16 also connects to a console PC 24 through a connecting bus 26. The console PC 24 is used for maintenance and access to the controller 16 and can be employed to set parameters of the controller 16 as is well known in the art.

Optionally, the controller may be connected to a remote data processing system like the data processing system 10 or a remote data storage system like the data storage system 14 (shown in dashed lines) for data back-up capability by a data link 28. The data link may be implemented as an ESCON fiber-optic link, or may be connected and operated in accordance with Fibre Channel or Gigabit Ethernet protocols. Other types of remote connections can also be used. The data link 28 enables a remote data storage system to store on its own devices a copy of information stored in the devices 18 of the data storage system 14 in a mirrored manner.

Figure 2:
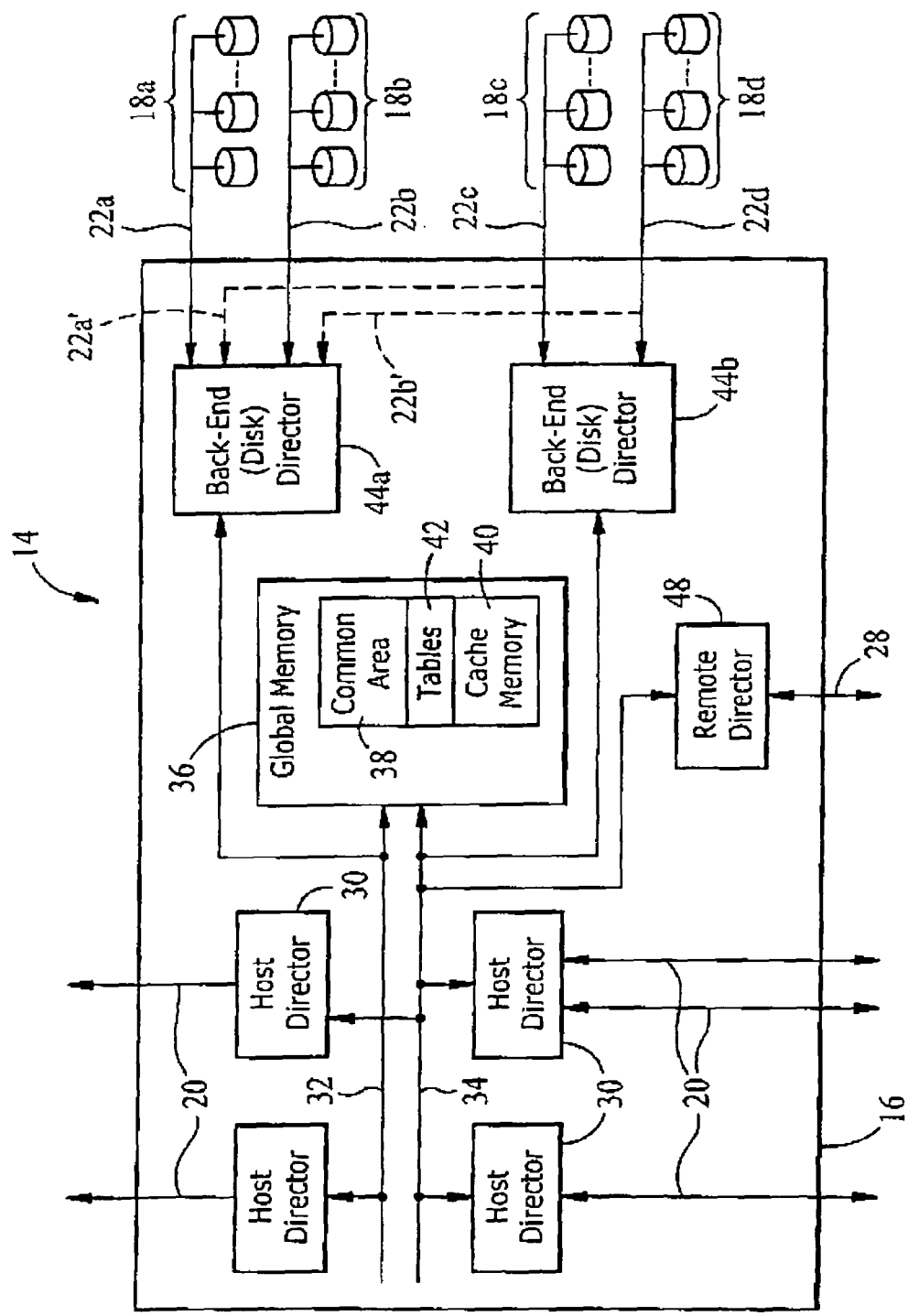
FIG. 2 is a detailed block diagram of the storage controller shown in FIG. 1.

In operation, the host computers 12a, 12b, . . . , 12m, send, as required by the applications they are running, commands to the data storage system 14 requesting data stored in the logical volumes or providing data to be written to the logical volumes. Referring to FIG. 2, and using the EMC Symmetrix controller as an illustrative example, details of the internal architecture of the data storage system 14 are shown. The communications from the host computer 12 typically connect the host computer 12 to a port of one or more host directors 30 over the SCSI bus lines 20. Each host director, in turn, connects over one or more system buses 32 or 34 to a global memory 36. The global memory 36 is preferably a large memory through which the host director 30 can communicate with the disk devices 18. The global memory includes a common area 38 for supporting communications between the host computers 12 and the disk devices 18, a cache memory 40 for storing data and control data structures, and tables 42 for mapping areas of the disk devices 18 to areas in the cache memory 40.

Also connected to the global memory 36 are back-end (or disk) directors 44, which control the disk devices 18. In the preferred embodiment, the disk directors are installed in the controller 16 in pairs. For simplification, only two disk directors, indicated as disk directors 44a and 44b, are shown. However, it will be understood that additional disk directors may be employed by the system.

Each of the disk directors 44a, 44b supports four bus ports. The disk director 44a connects to two primary buses 22a and 22b, as well as two secondary buses 22a' and 22b'. The buses are implemented as 16-bit wide SCSI buses. As indicated earlier, other bus protocols besides the SCSI protocol may be used. The two secondary buses 22a' and 22b' are added for redundancy. Connected to the primary buses 22a, 22b, are the plurality of disk devices (e.g., disk drive units) 18a and 18b, respectively. The disk director 44b connects to two primary buses 22c and 22d. Connected to the primary buses 22c, 22d are the plurality of disk devices or disk drive units 18c and 18d. Also connected to the primary buses 22c and 22d are the secondary buses 22a' and 22b'. When the primary bus is active, its corresponding secondary bus in inactive, and vice versa. The secondary buses of the disk director 44b have been omitted from the figure for purposes of clarity.

Like the host directors 30, the disk directors 44 are also connected to the global memory 36 via one of the system buses 32, 34. During a write operation, the disk directors 44 read data stored in the global memory 36 by a host director 30 and write that data to the logical volumes for which they are responsible. During a read operation and in response to a read command, the disk directors 44 read data from a logical volume and write that data to global memory for later delivery by the host director to the requesting host computer 12.

As earlier mentioned, the data storage system 14 may be remotely coupled to another data storage system 14 in a mirrored storage configuration via the data link 28. Still referring to FIG. 2, each data storage system 14 in the mirrored storage configuration includes a remote director 48 to connect to the data link 28 and handle transfers of data over that link. The remote director 48 communicates with the global memory 36 over one of the system buses 32, 34.

As is known in the art, mirrors of logical volumes may be maintained in conjunction with mirrors of physical devices. The logical volume mirrors are copies of each other and the physical device mirrors are copies of each other. For example, if there are two mirrored physical devices M1 and M2, four mirrored logical volumes A, B, C, D and M1 stores logical volumes A through D only, then M2 stores logical volumes A through D only. It is also possible to support logical volume mirrors on non-mirrored physical devices. In such a non-physical mirrored configuration, all of the corresponding mirrored copies of the logical volumes stored on one of the non-mirrored physical devices will not reside together on a different physical device. Examples of a physical mirrored arrangement and a "non-physical" mirrored arrangement (i.e., logical volume mirrors stored on non-mirrored physical devices) are later shown in FIGS. 5 and 6, respectively.

With reference to the data storage system 14, it is assumed that mirroring exists at the logical volume level, but not necessarily at the physical device level. Typically, for purposes of this embodiment, paired logical volume copies are employed and it is assumed that each unit stores a logical volume. The controller 16 can then respond to a read request by reading from either of the logical volume copies or mirrors stored in the physical devices 18. Accordingly, there is implemented in the controller 16, and among the disk adapters 40, a mirror service policy which identifies which of the device adapters 40 is primarily responsible for reading in response to requests from a host computer. This policy could be fixed at the beginning of a system set up, taking into account the expected loads. Preferably, however, the mirror service policy implementation is dynamic. That is, the mirror service policy can be modified, periodically, in response to statistics describing the nature of the read and write requests to the data storage system 14, to change the mirror service policy during the operation of the data storage system 14.

The statistics are collected over a given period. The information collected includes access rates for both read and write operations and how sequential the accesses were during the time period. Many factors are included in the policy decisions. These factors include: the activity level of the physical devices involved, the activity level of the disk directors involved, seek and transfer times, physical device utilization (based on the potential and actual transfer rates of a physical device), and how sequential the accesses were.

Figure 3:
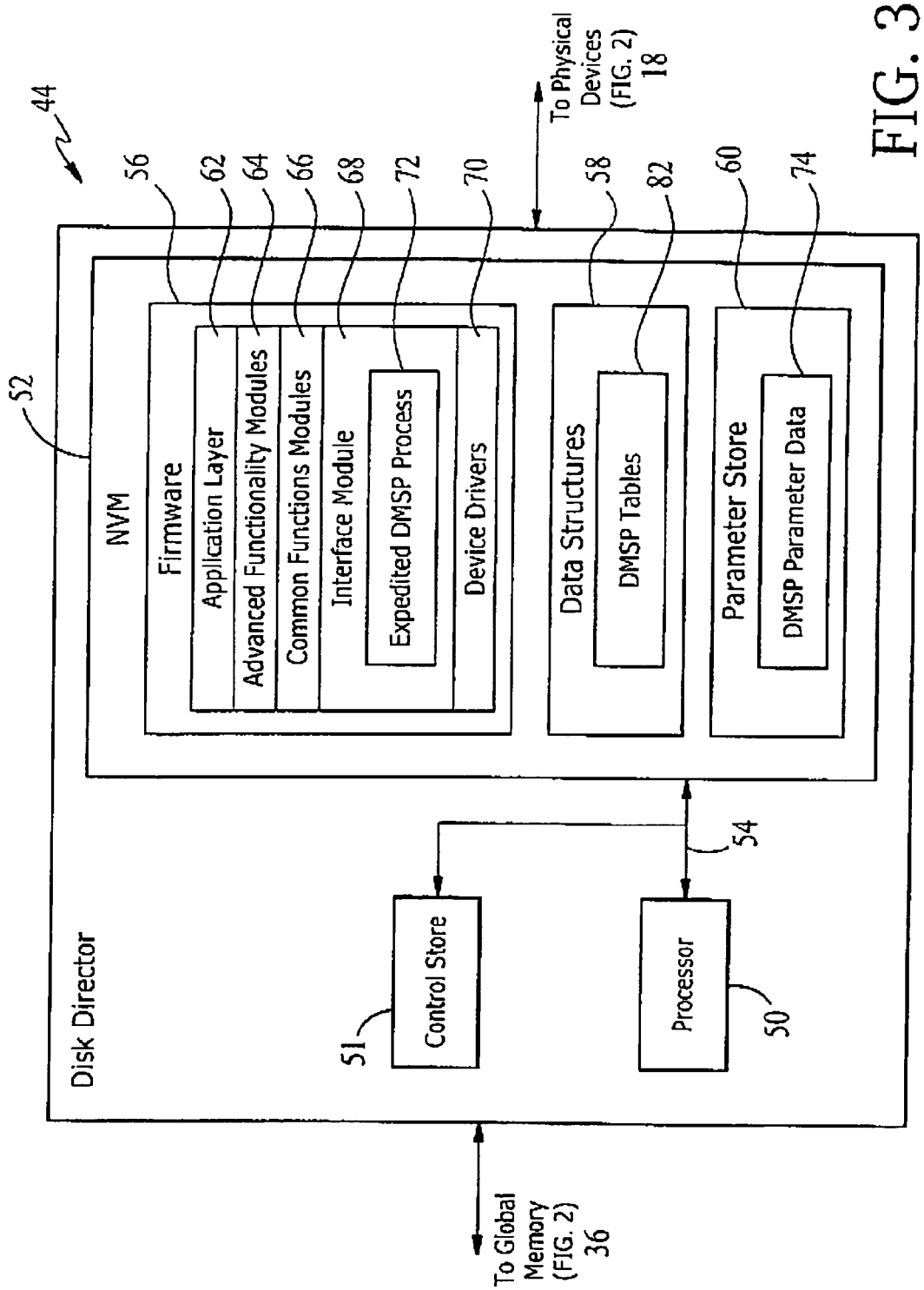
FIG. 3 is a block diagram of the disk director shown in FIG. 2.

As shown in FIG. 3, the directors 30, 44 and 48 (represented in the figure by the director 44) include a processor 50 coupled to a control store 51 and a local, nonvolatile memory (NVM) 52 by an internal bus 54. The processor 50 controls the overall operations of the director 44 and communications with the memories 51 and 52. The local memory 52 stores firmware (or microcode) 56, data structures 58, as well as parameter/variable data in a parameter store 60. The disk director 44 may include more than one processor 50 for parallel or distributed processing within a particular disk director.

Although not shown, it will be understood by those skilled in the art that the disk director 44 will include I/O interface logic, as well as bus and control logic. In addition, the disk director 40 may include transmit/receive buffers for temporarily storing data to be transferred to and received from the global memory 36.

The firmware 56, data structures 58 and parameter store 60 are read each time the data storage system 14 is initialized. The microcode 56 is copied into the control store 51 at initialization for subsequent execution by the processor 50.

While the director firmware 56, data structures 58 and parameter data of the parameter store 60 are preferably resident on the controller 16 (as described above), they may be partly resident on the PC 24 or the host 12.

The components of the director microcode 56 include the following: a system calls/host application layer 62; advanced functionality modules 64, which may be optional at the director level or even at the data storage subsystem level; common function modules 66, which are provided to each director; an interface module 68; and one or more physical transport (or device) drivers 70. The common function modules 66 includes a number of processes executed by the processor 50 to control data transfer between the host computer 12, the global memory 36 and the disk devices 18, e.g., a cache manager having routines for accessing the cache memory 40 and associated tables 42.

Interface modules exist for each of the different types of directors that are available based on connectivity and/or function and thus define the director functionality. Specifically, for the disk director 44, the interface module 68 is a disk interface module. That is, a director that has been loaded with the disk interface code 68 is thus programmed to serve as the disk director 44 or one of disk directors 44 (when more than one is present in the system). As such, it is responsible for controlling back-end operations of the controller 16. The disk interface module 68 includes an expedited Dynamic Mirror Service Policy (DMSP) process 72, as will be described. Also supported by the disk interface module 68 are services for read misses, write destaging, read prefetching, RAID, data copy, as well as other background drive operations (not shown).

The data structures 58 include DMSP tables for storing statistics, dynamic mirror service policies for each pair of logical volume mirrors and DMSP processing computation results.

The process 72 employs a cost function to estimate service time for each physical device in the data storage system. More specifically, the cost function for a physical device is defined as the seek time (a function of logical volume distribution) plus transfer time (a function of size of I/Os) for that physical device.

Figure 4A:
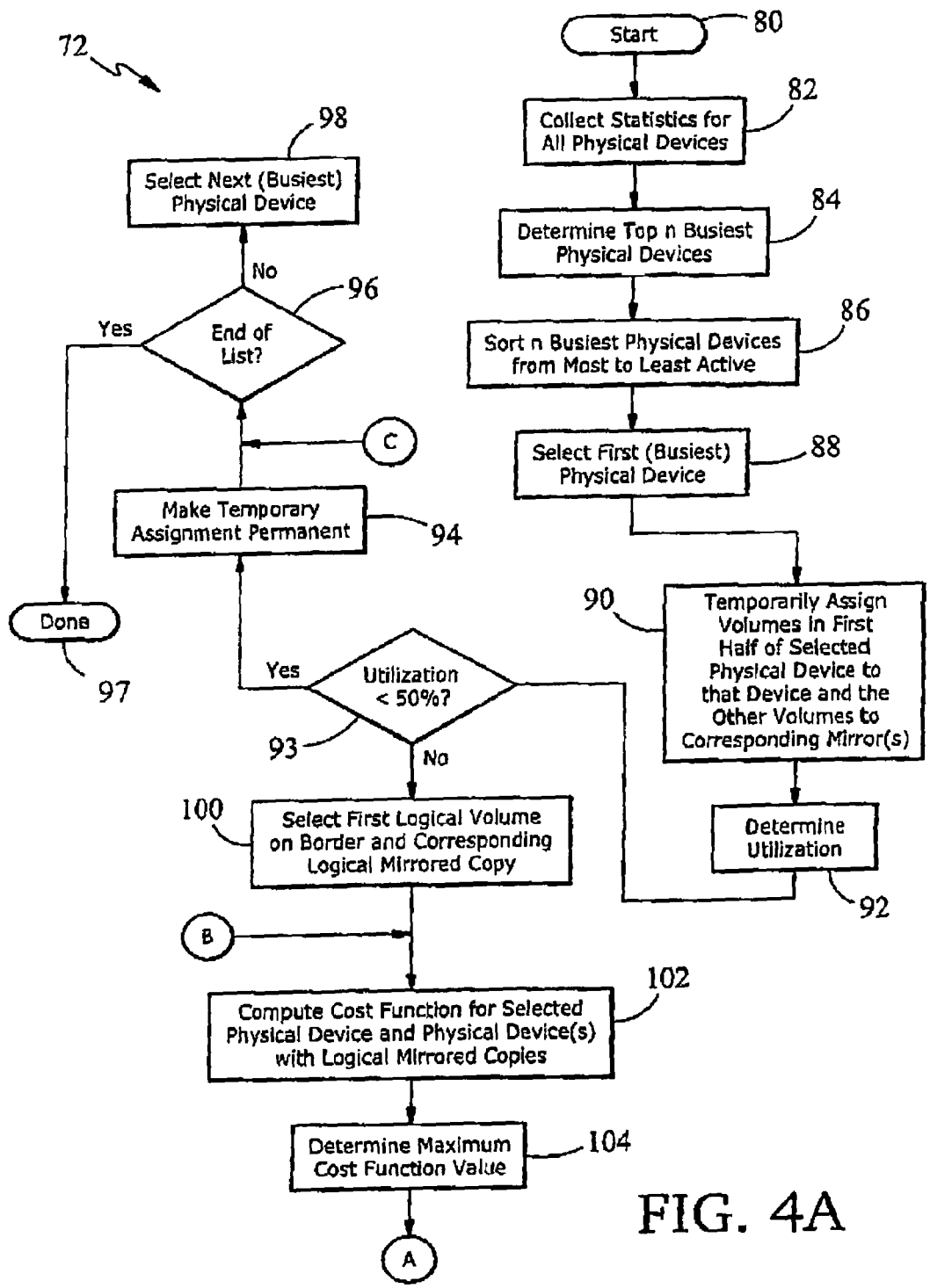
FIGS. 4A and 4B are flow diagrams illustrating an expedited mirror service policy process for the disk director shown in FIG. 3.

Referring to FIGS. 4A and B, a flow diagram illustrating the expedited DMSP process 72 is shown. The process 72 begins 80 by collecting statistics such as activity level and utilization for all of the physical devices (step 82). Once the time has come to reconsider logical volume mirror policies, the statistics are reviewed to determine the top n most active or busiest of the physical devices (step 84). Then busiest physical devices are sorted by activity level from most active to least active (step 86). The process 72 selects the first physical device on the sorted list, that is, the busiest disk (step 88). The process 72 temporarily assigns volumes in the first half of the selected physical device to itself and the remainder to corresponding mirror or mirrors (step 90). This change serves to minimize seeks, but does not guarantee load balance. The process computes or determines the utilization of the selected physical device with this temporary DMSP policy (step 92). The process 72 determines if the utilization of the selected physical device is less than a utilization threshold (step 93). In the described embodiment, the utilization threshold is 50%. The value of n and the utilization threshold are user-defined and are included in the DMSP parameter data 74 stored in the parameter store 60 (from FIG. 3).

If it is determined that the utilization is not greater than the threshold, in this case, 50% utilization, the process 72 makes the temporary policy permanent (step 94) and determines whether or not there is another physical device on the sorted list (step 96). If the process 72 determines that it has come to the end of the sorted list, it terminates (step 97). If there is at least one more physical device on the sorted list, the process 72 selects the next (busiest) physical device on the list (step 98).

Otherwise, that is, if it is determined that the utilization is greater than the threshold, the process 72, based on the temporary policy as described above, selects a first, outermost logical volume serviced by the selected physical device (the logical volume adjacent to a border between the logical volume(s) serviced by the selected physical device and logical volume(s) serviced by another physical device) and its corresponding mirrored copy (step 100). The process 72 thus determines which one or more of the other physical devices store a mirrored copy corresponding to one of the logical volumes (including the selected logical volume) serviced by the selected physical device. As will be discussed in further detail later, if the selected physical device is physically mirrored, then there will only be one other physical device involved in any DMSP adjustment/evaluation for the selected physical device. If the mirrored copies of the logical volumes handled by the selected physical device reside on more than one physical device, then the DMSP update of the selected physical device will involve more than one other physical device. The process 72 computes the cost functions for the selected physical device as well as the physical device(s) having mirrored copies corresponding to the logical volumes currently assigned to the selected physical device (step 102) and determines the maximum of the computed cost functions (step 104). The process 72 simulates a first policy change for the selected physical device by reassigning the preferred device mirror policy from the selected logical volume to the corresponding mirrored copy (step 106). At this stage, and as indicated above, the process is merely simulating the change, that is, the reassignment has not actually been implemented by recording the policy "swap" in the DMSP tables 82 (as described in the above-referenced U.S. applications). Rather, the reassignment information, as well as the various computation results, is stored in processor memory. The process 72 then recomputes the cost function values for the physical devices involved in the first simulated policy change (step 108) and determines a new maximum cost function as the maximum of the recomputed values under the first policy evaluation (step 110).

The process 72 then considers a second policy change that simulates an interleaved move. That is, the process 72 simulates moving a second half of the selected logical volume (that is, the half nearest the border) to the other physical device (step 112). The process 72 recomputes the cost functions (step 114) and determines a new maximum cost function value for the $2^{nd}$ policy change (step 116).

At this point, the process 72 has generated three maximum cost function values, one value for no change in policy (that is, using the temporary policy of step 90), a second value for the first policy change (change mirror for volume) and a third number for the second policy change (interleaved move). The policy chosen for the logical volume under consideration is the minimum of these three values. Thus, the process 72 determines the minimum of the three maximum cost function values (step 118). The process records the policy change corresponding to the determined minimum value in the DMSP tables (step 120). Because the process 72, is starting off with the temporary policy when it evaluates the first and second policy evaluations on the temporary policy, the policy that is recorded is the temporary policy as modified by the policy change corresponding to the minimum unless that policy change is the temporary policy itself, in which case the process 72 records the temporary policy as the new policy.

If the minimum corresponds to the first policy change (step 122), the process 72, proceeding to move the border further inward, i.e., in a sequential manner from the outermost to innermost of logical volumes serviced by the selected physical device, determines if there is another logical volume (serviced by the physical device) on the physical device (step 124). If so, the process 72 proceeds to the next logical volume in the sequence (step 126) and returns to step 102.

If the logical volume is the last of any logical volumes serviced by the physical device, the process 72 returns to step 96 to determine if another of the n busiest physical devices on the sorted listed is to be evaluated.

If the minimum of the maximum cost function values corresponds to either the interleaved policy change or no change in policy, the process 72 returns to the step of determining if a next busiest disk on the sorted list is to be evaluated (step 96).

Figure 4B:
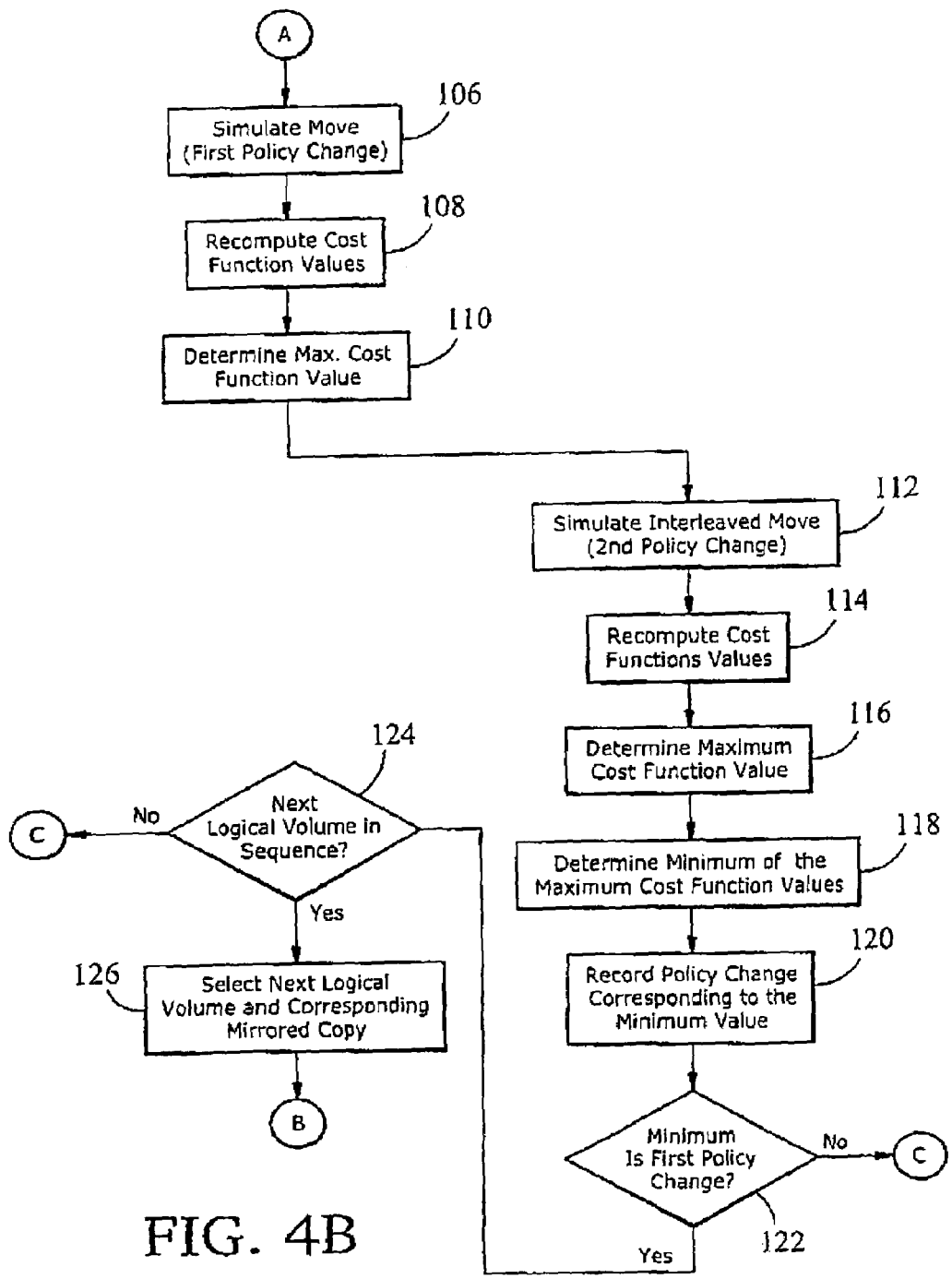
Figure 5:
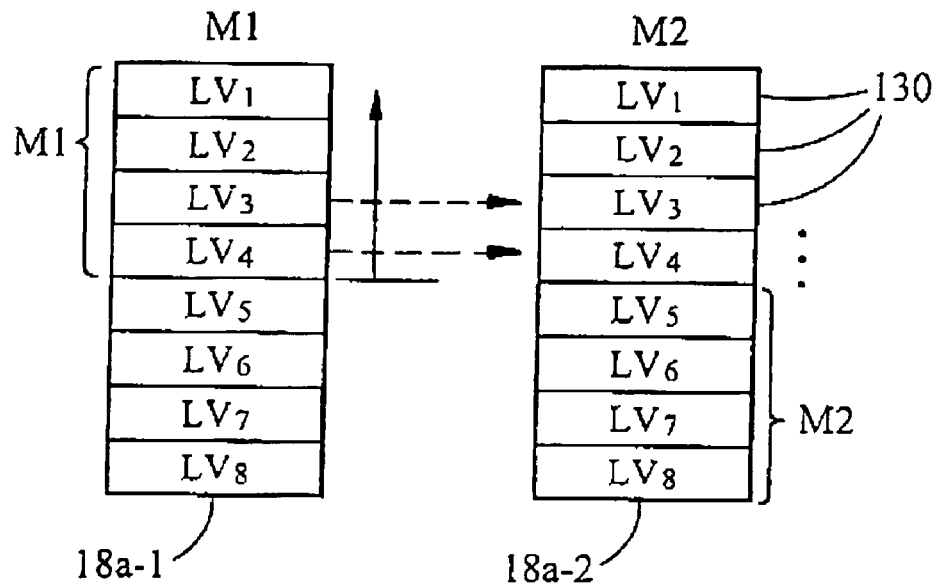
FIG. 5 is an example of simulated policy changes as performed by the process (of FIGS. 4A and 4B) for physical mirrors.

FIG. 5 provides an example of the iterative simulated policy changes involving two mirrored ones of the physical devices 18, shown as 18a-1 ("M1") and 18a-2 ("M2"). Referring to FIG. 5, the physical devices M1 and M2 store a plurality of logical volumes 130. In the example shown, the physical devices M1 and M2 are configured to store eight logical volumes apiece, for a total of eight logical volumes mirrored pairs. Under the temporary policy (of step 90 in FIG. 4), the first half of the logical volumes ($LV_1$ to $LV_4$) are serviced by M1 and the second half of the logical volumes ($LV_5$ to $LV_8$) are serviced by M2. Thus, the border (indicated by the solid arrow) for the logical volumes serviced by M1 is determined to be between $LV_4$ and $LV_5$. It is assumed for this example that the percentage of sequential I/Os seen by M1 is 80 and the percentage of sequential I/Os seen by M2 is 20.

Referring to FIGS. 4A, 4B and 5, the process 72 selects $LV_4$ to be moved from M1 to M2 (step 100). It computes the respective initial cost unction values C(M1) and C(M2) of the physical devices M1, M2 as 100 and 50, respectively (step 102), and determines a maximum of the computed values, that is, 100 (step 104). After the simulated first policy move (step 106), the process 72 recomputes the cost functions C(M1)and C(M2) as 80 and 70, respectively (step 108), and determines 80 to be the maximum value (step 10). The process 72 also evaluates an interleaved move (step 112), that is, moving only the second half of $LV_4$ from M1 to M2. The process 72 computes C(M1) and C(M2) for the interleave as 90 and 75, respectively (step 114), with a maximum value of 90. As the maximum value of 80 for the first policy change is the minimum of the three maximum cost function values, the process 72 proceeds to evaluate $LV_3$, for transfer from M1 to M2 (step 126).

In this second pass, after moving $LV_3$ from M1 to M2, the cost functions C(M1) and C(M2) are computed to be 60 and 80, respectively, and the new maximum is determined to be 90. The process 72 evaluates an interleaved move, that is, moving only the second half of $LV_3$ from M1 to M2. The process 72 computes C(M1) and C(M2) for the interleave as 70 and 75, respectively. As the new maximum of 75 is less than the maximums of 85 (first policy change) and 80 (no change), the process 72 records the policy changes for $LV_4$ and $LV_3$ (interleave) so that $LV_4$ and the second half of $LV_3$ will be serviced by M2 instead of M1 (step 126).

Figure 6:
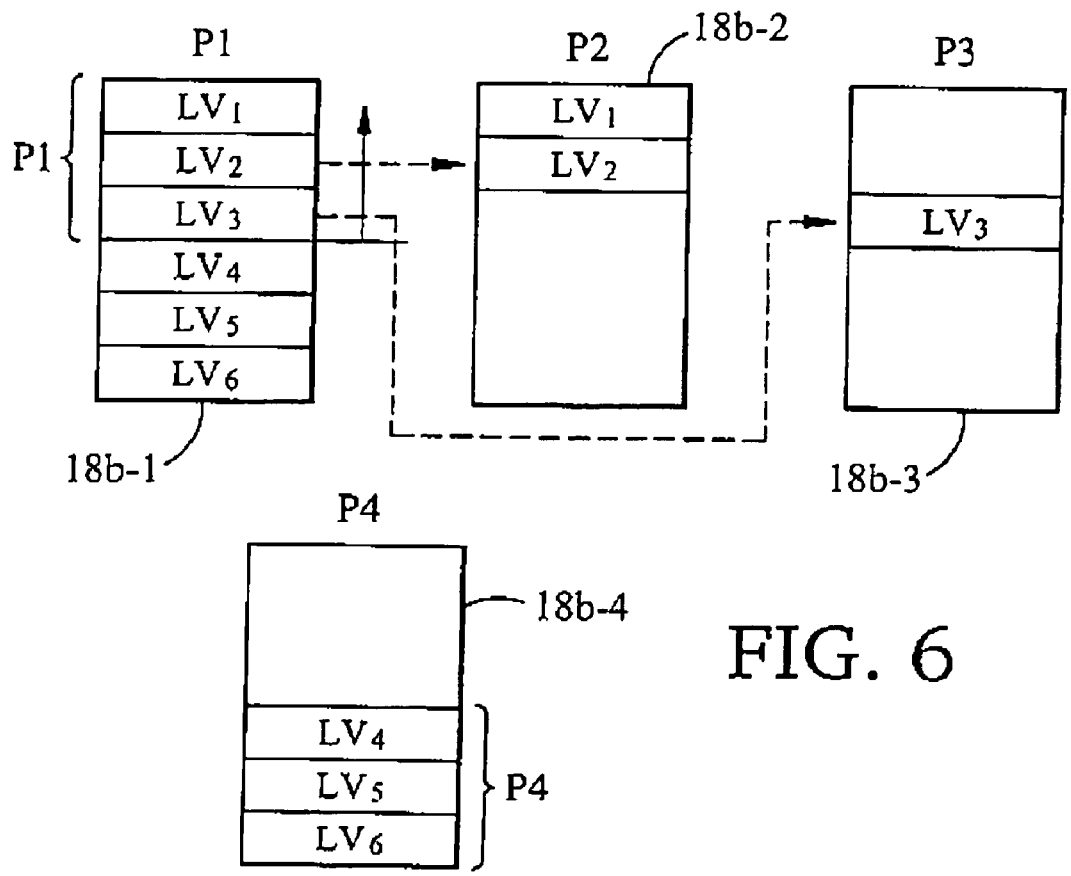
FIG. 6 is an example of simulated policy changes as performed by the process (of FIGS. 4A and 4B) for non-physical mirrors.

As indicated earlier, the physical devices need not be mirrored. FIG. 6 illustrates a non-physical mirrored arrangement. In the example shown, there are four non-mirrored physical devices 18b-1 ("P1"), 18b-2 ("P2"), 18b-3 ("P3"), 18b-4 ("P4"). As in the example shown in FIG. 5, the selected one of the n busiest disks, in this case, "P1", services logical volumes $LV_1$ through $LV_3$. The logical volumes $LV_4$ through $LV_6$ are handled by P4. The logical mirrors for $LV_1$ through $LV_3$ reside on P2 and P3. More specifically, the logical mirrored pair for $LV_3$ resides on P1 and P3, and the logical mirrored pairs for $LV_2$ and $LV_1$ involve P1 and P2.

Referring to FIGS. 4A, 4B, and 6, the processing for the non-physical mirrored arrangement is much the sane as it is for a physical mirrored arrangement (such as the arrangement depicted in FIG. 5) except that maximum cost function determinations must take into account all of the physical devices on which logical mirrored pairs reside. For the example shown in FIG. 6, the physical device P1 is the physical device under evaluation. It includes six logical volumes, $LV_1$ through $LV_6$. According to the existing mirror service policy, $LV_1$ through $LV_3$ are serviced by P1 and $LV_4$ through $LV_6$ are serviced by P4. Mirrored copies of $LV_1$ and $LV_2$ are maintained by P2 and a mirrored copy of $LV_3$ is maintained by P3. If the process 72 determines that the utilization of P1 is less than the threshold, then the border between $LV_3$ and $LV_4$ remains fixed, that is, P1 will service $LV_1$ through $LV_3$, and P4 will service $LV_4$ through $LV_6$ (at least until the next updating occurs). If the utilization is determined to be greater than the threshold, the process attempts to move the border in the direction of the solid arrow, one logical volume (or half volume, in the interleaved case) at a time). Thus, the process 72 tries to reassign the work for $LV_3$ to P3, and possibly the work for $LV_1/LV_2$ to P2, in the manner described above, with the objective of reducing the worst case cost function with each successive iteration until the worst case cost function can be reduced no further.

For each iteration, the maximum cost function value is taken of the physical devices affected. For example, if $LV_3$ is being adjusted, then the maximum value is determined between the values for the cost function C(P1) and the cost function C(P3). As was described above with reference to FIG. 4, the process 72 computes a maximum for each of the three policies and adopts the policy that provided the value determined to be the minimum value.

It should be noted that once the border for a particular physical device has been moved in one direction as a result of the expedited DMSP processing for that physical device, its location is fixed for the remainder of the processing. The border cannot then be moved in the other direction when logical volumes residing on that physical device are involved in a subsequent evaluation of another one of the n busiest physical devices. Thus, the process 72 recognizes that a physical device involved in an evaluation of a different physical device has been evaluated itself already and makes no attempt to transfer volume activity to that physical device.

Figure 7:
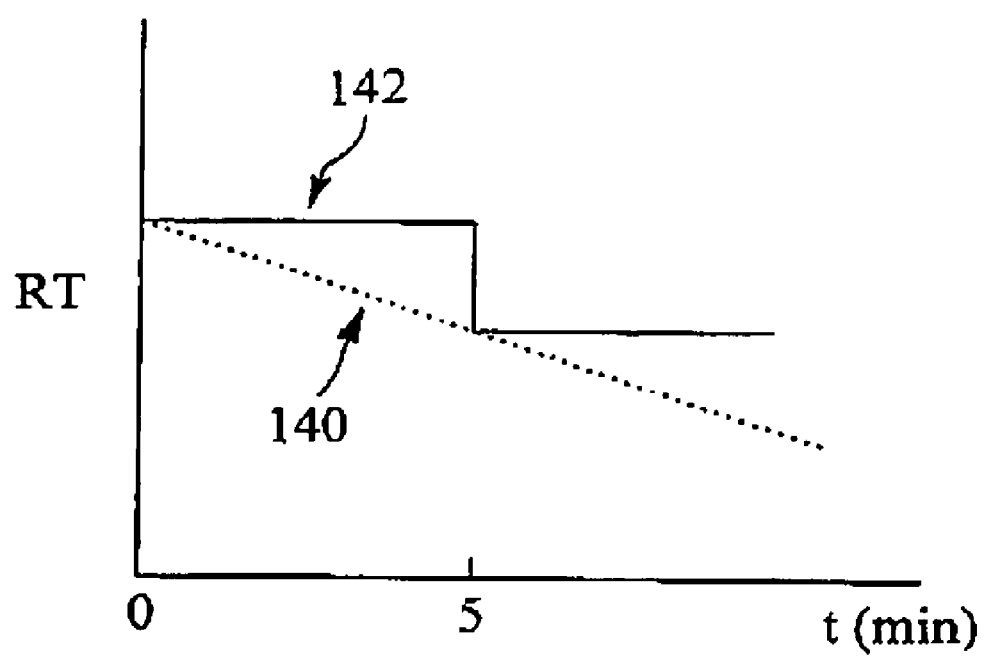
FIG. 7 is a graphical depiction of response time versus time for the expedited DMSP process in comparison to a prior DMSP processing scheme.

The illustration of FIG. 7 depicts the responsiveness of the expedited DMSP process (curve indicated by reference numeral 140) relative to a prior DMSP process that sorts/processes by logical volume and for all logical volumes in all physical devices in the system (curve indicated by reference numeral 142) in terms of response time ("RT") as a function of time. Because the old scheme has to perform a sort for and evaluate all physical devices logical volume by logical volume, it can only make response time improvements (based on DMSP statistics-based processing updates) at intervals of time "t". The value of t can be as great as 5 minutes. In contrast, the expedited DMSP process 72, which evaluates only the n busiest of the physical devices and therefore performs policy updates at a much greater frequency (for example, every 20 seconds), adjusts more quickly to changes in system workload for better response time results.

Other embodiments are within the scope of the following claims.

What is claimed is:

1. A method for optimizing response time of physical devices in a data storage system comprising:
   collecting statistics for each of the physical devices;
   determining from the statistics a number n of the physical devices that are the most active; and
   for each of the n most active of the physical devices, adjusting a mirror service policy associated with one or more mirrored logical volumes serviced by the physical device to reduce seek time.

2. The method of claim 1, wherein the statistics include utilization and wherein adjusting is performed if the utilization of the physical device is greater than a threshold value.

3. The method of claim 1, wherein adjusting comprises:
   using a cost function analysis to determine that workload assigned to the one or more selected mirrored logical volumes according to a current mirror service policy can be re-assigned to a corresponding mirrored copy according to a new mirror service policy, the cost function analysis indicative of seek time and involving the selected physical device and any physical device on which a mirrored copy resides.

4. The method of claim 3, wherein the physical devices involved in the cost function analysis are physical mirrors.

5. The method of claim 3, wherein using comprises;
   computing cost functions for each of the physical devices involved in the cost function analysis and determining a maximum value from the computed cost functions, based on the current mirror service policy and the new mirror service policy.

6. The method of claim 5, wherein using comprises:
   determining that the reassignment of workload can be made if the maximum value based on the new mirror service policy is less than the maximum value based on the current policy.

7. The method of claim 6, wherein adjusting comprises processing the one or more logical volumes in a sequence beginning with the outermost logical volume bordering logical volumes serviced by another physical device.

8. The method of claim 7, wherein, for each successive one of the processed logical volumes, the new mirror service policy of an immediate predecessor of the processed logical volumes is used as the current mirror service policy for the cost function analysis.

9. The method of claim 2, wherein the threshold value comprises fifty percent.

10. A computer program product residing on a computer readable medium for optimizing response time of physical devices in a data storage system, comprising instructions for causing a computer to:
    collect statistics for each of the physical devices;
    determine from the statistics a number n of the physical devices that are the most active; and
    for each of the n most active of the physical devices, adjust a mirror service policy associated with a mirrored logical volume services by the physical device to reduce seek time.

11. A data storage system comprising:
    physical devices having mirror logical volumes stored thereon;
    a storage controller for controlling access to the physical devices; and
    wherein the storage controller collects for the physical devices statistics including utilization, determines from the statistics a number n of the physical devices that are the most active and, for each of the n most active of the physical devices, adjusts a mirror service policy associated with a mirrored logical volume serviced by the physical device to minimize seek time when the utilization is greater than a threshold value.

12. The computer program of claim 10 wherein the mirror service policy is adjusted in response to simulation of a new mirror service policy.

13. The computer program of claim 12 wherein the mirror service policy is adjusted in response to a cost function analysis of a selected one of the n most active physical devices as a result of a current mirror service policy and a cost function analysis of the selected physical device as a result of the new mirror service policy.

14. The computer program of claim 11 wherein the mirror service policy is adjusted in response to simulation of a new mirror service policy.

15. The computer program of claim 14 wherein the mirror service policy is adjusted in response to a cost function analysis of a selected one of the n most active physical devices as a result of a current mirror service policy and a cost function analysis of the selected physical device as a result of the new mirror service policy.

16. The method of claim 1 further comprising sorting the n most active of the physical devices by activity level and wherein the mirror service policy is adjusted for each of the n most active of the physical devices in the sorted order.

17. The computer program product of claim 10 further comprising instructions for causing a computer to sort the n most active of the physical devices by activity level and wherein the mirror service policy is adjusted for each of the n most active of the physical devices in the sorted order.

18. The data storage system of claim 11 wherein the storage controller sorts the n most active of the physical devices by activity level and wherein the mirror service policy is adjusted for each of the n most active of the physical devices in the sorted order.

* * * * *

UNITED STATES PATENT AND TRADEMARK OFFICE
CERTIFICATE OF CORRECTION

PATENT NO. : 6,954,833 B1
DATED : October 11, 2005
INVENTOR(S) : Yochai et al.

It is certified that error appears in the above-identified patent and that said Letters Patent is hereby corrected as shown below:

Column 2,
Line 31, delete "frequent a basis" and replace with -- frequent basis --.

Column 3,
Line 9, delete "form the various" and replace with -- from the various --.

Column 4,
Line 11, delete "in inactive," and replace with -- is inactive, --.

Column 6,
Line 17, delete "Then busiest" and replace with -- the n busiest --.

Column 8,
Line 10, delete "cost unction" and replace with -- cost function --.
Line 16, delete "(step 10)." and replace with -- (step 110). --.
Line 49, delete "the sane" and replace with -- the same --.

Column 9,
Line 1, delete "case) at a time)." and replace with -- case) at a time. --.

Signed and Sealed this

Twenty-eighth Day of March, 2006

JON W. DUDAS
*Director of the United States Patent and Trademark Office*